United States Patent Office.

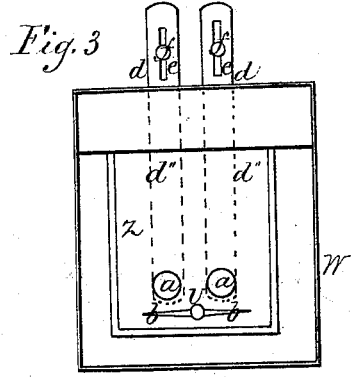
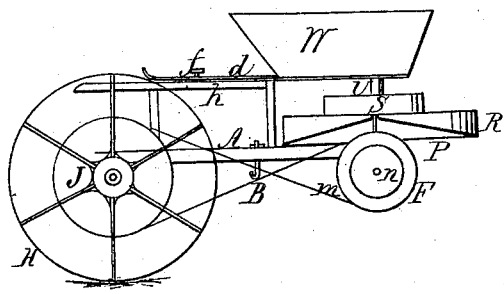
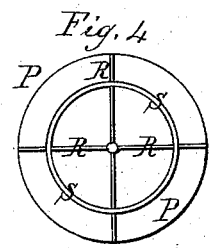
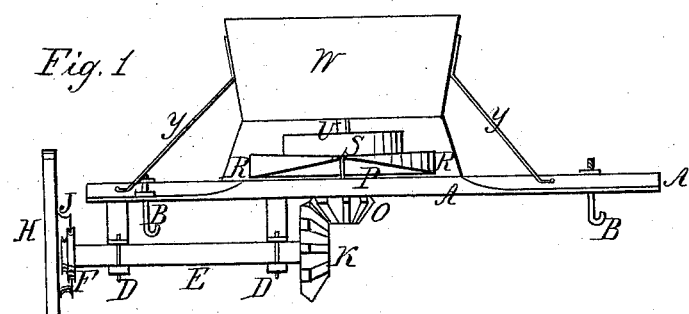

TEUNIS VREELAND, OF WATAGA, ILLINOIS.

*Letters Patent No. 91,799, dated June 22, 1869.*

IMPROVEMENT IN SEED-SOWER.

The Schedule referred to in these Letters Patent and making part of the same.

*To all whom it may concern:*

Be it known that I, TEUNIS VREELAND, of Wataga, in the county of Knox, and State of Illinois, have invented certain new and useful Improvements in Seed-Sower; and I do hereby declare that the following is a full, clear, and exact description of the same, reference being had to the accompanying drawings, making a portion of this specification, in which—

Figure 1 is a rear view.
Figure 2 is a side view.
Figure 3 is a top view of the hopper and slides.
Figure 4 is a top view of the distributer.

Similar letters of reference indicate corresponding parts in all the figures.

The nature of this invention relates to improvements in that class of seed-sowers known as broadcast; and The invention consists in the improved way of arranging the radial arms on the distributer, and combining with them a band to govern the fall of the seed from the hopper to the distributer.

It also consists in a sweep on the upper end of the disk-shaft to keep the feed-holes clear.

It further consists in the way of attaching the whole device to any common wagon.

To enable others to understand the construction and operation of my invention, I will proceed to describe it with reference to the drawings.

A represents a platform or plain flat plank, of suitable size, and attached on the rear end of a wagon-body by the hooks B B.

U represents a vertical shaft, having bearings in the platform A, and in the hopper W, and carrying on the lower end the bevel-wheel O, and between the platform and hopper, the distributer P R S, and on its upper end, the sweep b, fig. 3.

The circular disk P is slightly raised in the centre, cone-shaped, and is provided with the straight radial arms R, which extend just to its outer edge, and support on their upper edge the band S, which guides the seed against natural wind or the wind of the distributer itself, or from any other cause, safe on to the best position on the distributer.

Z represents a false bottom in hopper W, with holes, a a, corresponding with similar holes in the hopper W.

These holes are always kept open from choking by the sweep b, which is attached to and revolves with the shaft U.

d d represent slides passing in between the false bottom Z, and the bottom of the hopper W, and over the holes a a.

The slides d d may be adjusted in the desired position by the thumb-screws f and slots e.

h represents a narrow board, on which the slides d d are supported and adjusted.

Y Y represent braces for supporting the hopper W.

E represents a horizontal shaft, having bearings in the vertical arms D D, extending down from the platform A.

The shaft E carries on one end the bevel-wheel K, gearing with the bevel-wheel O, and on its outer end the pulleys F and n.

The motion is transmitted to the pulleys F and n, from the hind wheel H of the wagon, by means of the cord m passing over said pulleys, and over another on the wheel H.

The direction of the revolution of the disk P may be regulated at will, by crossing, or leaving without crossing, the cord m.

The operation of this machine is deemed plain from the drawings.

The grain being placed in the hopper, and the feed regulated by the slides d d, the grain falling on the disk P will be distributed by the centrifugal force of the revolving disk P, and the rim S will guide the grain from the hopper W to the disk P.

Having thus described my invention,

What I claim as new, is—

The combination and arrangement of the platform A, hopper W, distributer P, hooks B, pinion O, shaft E, bearings D D, and pulleys F and J, substantially as described, and for the purpose set forth.

Signed at Galesburg, Illinois, this 30th day of January, 1869.

TEUNIS VREELAND.

Witnesses:
   H. C. WALKER,
   J. B. HARSH.